(12) United States Patent
Hsu et al.

(10) Patent No.: US 9,841,661 B2
(45) Date of Patent: Dec. 12, 2017

(54) PROJECTING SYSTEM WITH EXTENDABLE MODULES

(71) Applicant: AIPTEK International GmbH, Willich (DE)

(72) Inventors: Hsian Shi Hsu, Hsinchu (TW); Chiann Wen Twu, Hsinchu (TW); Heng Liu, Hsinchu (TW); Hsin Hung Tu, Hsinchu (TW)

(73) Assignee: Aiptek International GmbH, Willich (DE)

( * ) Notice: Subject to any disclaimer, the term of this patent is extended or adjusted under 35 U.S.C. 154(b) by 0 days.

(21) Appl. No.: 14/963,938

(22) Filed: Dec. 9, 2015

(65) Prior Publication Data

US 2016/0259231 A1    Sep. 8, 2016

(30) Foreign Application Priority Data

Mar. 4, 2015 (TW) .............................. 104106882 A

(51) Int. Cl.
*G03B 21/14* (2006.01)
*G03B 21/00* (2006.01)

(52) U.S. Cl.
CPC ........... *G03B 21/145* (2013.01); *G03B 21/00* (2013.01); *G03B 21/14* (2013.01)

(58) Field of Classification Search
CPC ....... G03B 21/145; G03B 21/14; G03B 21/00
See application file for complete search history.

(56) References Cited

U.S. PATENT DOCUMENTS

| | | | |
|---|---|---|---|
| 2004/0246450 A1* | 12/2004 | Soper ................... | H04N 9/3141 353/94 |
| 2007/0091284 A1* | 4/2007 | Solomon .............. | G03B 21/145 353/119 |
| 2007/0247794 A1* | 10/2007 | Jaffe ...................... | G06F 1/1632 361/679.01 |
| 2015/0220195 A1* | 8/2015 | Jin ......................... | G06F 1/1643 345/173 |

* cited by examiner

*Primary Examiner* — Sultan Chowdhury
*Assistant Examiner* — Magda Cruz
(74) *Attorney, Agent, or Firm* — Muncy, Geissler, Olds & Lowe, P.C.

(57) ABSTRACT

A projecting system is proposed. The projecting system comprises a mini projector with at least one first building block structure, a battery pack with at least one second building block structure, and an application unit with at least one third building block structure. One of the at least one first building block structure is electrically coupled to one of the at least one second building block structure. One of the at least one first building block structure is electrically coupled to one of the at least one third building block structure.

9 Claims, 4 Drawing Sheets

PROJECTING SYSTEM WITH EXTENDABLE MODULES

TECHNICAL FIELD

The present invention generally relates to a projecting apparatus, more particularly, to a projecting system with multiple functions.

BACKGROUND

Currently, as a projection brief is prepared in the public meeting, you must carry a mobile computer and a digital projector, and thereby the transferred video files of the video device rendering outside projection to show by the digital projector. To complete the projection, the video files need to be filed and stored on the computer, and a mobile computer and a digital projector are required for the digital projection. Processing procedures of conversion and transmission for the digital data are complicated. It is inconvenient for a user due to heavy and more hardware apparatus. Moreover, the conventional video projector is always combined with the computer which applications are monotonous and unchanged.

Digital video projector can enlarge an image data to project onto a screen or background, to allow more people to simultaneously watch the displayed content of image on the screen or background. With the advancement of technology, a variety of electronic products tend to high-speed, high-performance, and compact size. Under this trend, pico projector/mini projector has gradually become the main product of the digital projector.

In general, light source of mini projector uses light-emitting diodes (LEDs) or other solid-state light source, in order to improve its overall brightness required, and thus increasing the brightness of the image projected. When the mini projector is made as the end product, the size of the mini projector with battery is slightly larger than that of a mobile phone. Because mini projector has the property of compact size and portable, so it is availably use anywhere. In addition, a battery of miniature projectors are expected to provide a few hours of electricity, so the entertainment purposes, it provides enough electricity to meet the general needs. In addition, mini projector with battery inside can provide power for operation in several hours, which can afford the requirement of entertainment. In addition, mini projector can be applied for meeting presentation, projecting 2-inch to 100-inch image. However, battery of the general mini projector is mostly arranged inside the body. When the power of battery runs out, it needs to be charged through the external power source due to non-removable design of battery. However, high lumens mini projector is yet to design a built-in battery due to the consideration of larger volume and power consumption. Therefore, it is inconvenience to use the high lumens mini projector when user is on the move.

Therefore, based-on the shortcomings, the present invention provide a newly mini projecting system distinguished from the conventional mini projectors.

SUMMARY OF THE INVENTION

According to an aspect of the present invention, the present invention provides a projecting system, which characterizes in that comprises a mini projector with at least one first building brick structure; and a charging unit with at least one second building brick structure; wherein the at least one first building brick structure is engaged and electrically coupled to the at least one second building brick structure of the charging unit.

According to one aspect of the present invention, the projecting system further comprises at least one electronic device, wherein the at least one electronic device has at least one third building brick structure, wherein one of the third building brick structure of one of the at least one electronic device is engaged and electrically coupled to one of the at least one first building brick structure.

According to another aspect of the present invention, the at least one electronic device includes a mini smart TV, speaker or mini camera.

According to one aspect of the present invention, the at least one electronic device includes a Tablet PC, smart phone or application unit.

According to an aspect of the present invention, the at least one electronic device includes a 4G LTE unit, notebook or wireless module.

According to yet another aspect of the present invention, the present invention provides a projecting system, which characterizes in that comprises a mini projector with at least one first building brick structure; and at least one electronic device, wherein each one of the at least one electronic device has at least one second building brick structure; wherein one of the second building brick structure of one of the at least one electronic device is engaged and electrically coupled to one of the at least one first building brick structure of the mini projector.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Figure 1:
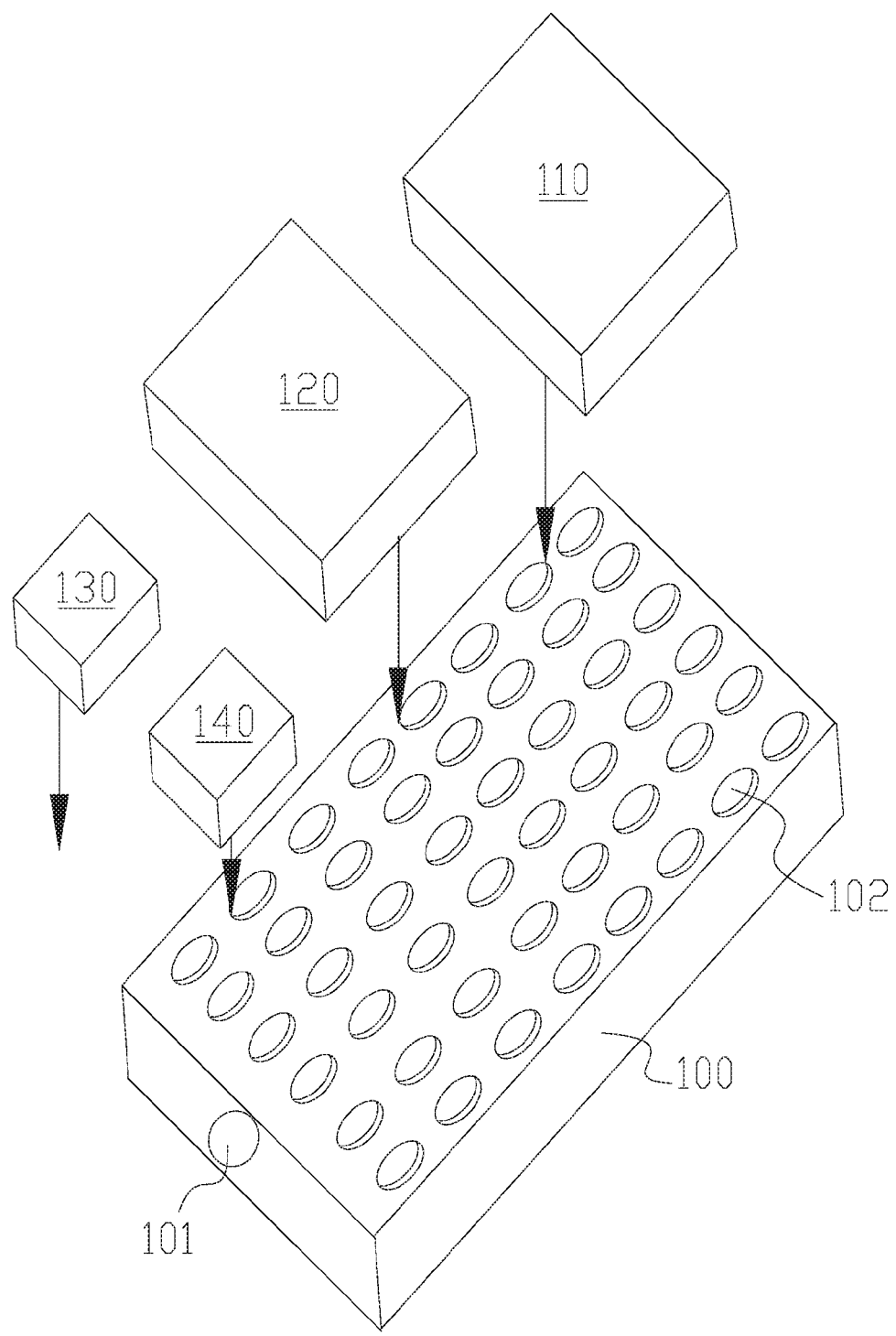
FIG. 1 illustrates a mini projecting system according to a first embodiment of the present invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a mini projecting system which may be configured (connected) with various electronic devices by vertically stacking or horizontally connecting from each other. The various electronic devices or modules can be electrically coupled directly for each other, and a mini projector can be electrically coupled with all the required electronic devices without the need of an external cable or connector to form a mini projecting system. The mini projector may be structurally engaging with electronic devices, while electrically coupled to such electronic devices. Based-on each of electronic devices and a mini projector with their own modular structure, building brick structure, or stacking structure, mini projector can be combined with the desired electronic devices to form a mini projecting system. The mini projector also has the above connection structure, electrically connected and engaged to the applied electronic device. The electronic device can output digital data, audio and video data to the mini projector, and then image of the digital data or the video data displayed on the electronic device is projecting through the mini projector. In addition, the mini projection device may be connected to an external power supply (charging device) for charging to the mini projection device and the electronic device. All of the above-mentioned mini projector, electronic devices and charging device have their own building brick structure (for example, similar to Lego building brick structure, which is conventional technology and therefore the detailed description is omitted). The electronic devices and the mini projector may be vertically stacked or horizontally electrically coupled/connected from each other based-on their own building brick (block) structure to constitute a mini projecting system.

In one embodiment, the building brick (block) structure defines an interlocking portion, a concave portion or a protrusion portion, disposed on upper side or lower side, left side or right side, front side or rear side, upper side and lower side, left side and right side, front side and rear side, or any side of the six sides of the electronic device.

In one embodiment, the building brick structure may be disposed on upper side or lower side, left side or right side, front side or rear side, or any side of the six sides of the electronic device, or any direction for the electronic device, for facilitating the electronic devices stacking or connecting with each other. In other others, the electronic devices and the mini projector may be vertically stacked or horizontally electrically coupled/connected from each other, or by stacked or electrically coupled/connected from each other in any direction, to assemble the electronic devices and the mini projector to constitute a mini projecting system.

In one embodiment, the electronic devices include, for example device with specified software system or module, a mobile phone, a smart phone, a portable game console, a personal digital assistant (PDA), a notebook or a Tablet PC.

FIG. 1 shows a projecting system with a mini projector combining with electronic devices according to an embodiment of the present invention. In this embodiment, the projecting system comprises a mini projector 100 which may be a mobile projector, a first electronic device 110, a second electronic device 120, a third electronic device 130, and a fourth electronic device 140. In this embodiment, the first electronic device 110 is a power supply or charging device (battery), a second electronic device 120 with Android unit, a third electronic device 130 with Wintel Tablet Unit, and a fourth electronic device 140 is a mini camera. Each of the mini projector 100, the first electronic device 110, the second electronic device 120, the third electronic device 130, and the fourth electronic device 140 has building brick structure formed thereon. For example, the mini projector 100 has building brick structure 102 formed on the upper side of the mini projector 100 for combining with the first electronic device 110, the second electronic device 120, the third electronic device 130, and the fourth electronic device 140. In this example, the lower side building brick structure (not shown) of the first electronic device 110, the second electronic device 120, the third electronic device 130, and the fourth electronic device 140 is interlocked to engaged and electrically connected to the upper side building brick structure 102 of mini projector 100. In one embodiment, building brick structure 102 has an interlocking structure, a concave structure or a protrusion structure. As the building brick structure 102 of mini projector 100 is interlocked to the building brick structure of the first electronic device 110, the second electronic device 120, the third electronic device 130, and the fourth electronic device 140, the mini projector 100 is therefore structurally engaging with and electrically coupled to such electronic devices. In one embodiment, the connection (or communication) mode between the mini projector 100 and such electronic devices (110, 120, 130, 140) comprises output/input port-to-port connection, wherein port of the mini projector 100 directly inserting into port of the electronic devices (110, 120, 130, 140).

For example, the mini projector 100 is a mobile projector. In one embodiment, the mini projector 100 includes a micro-processor and a projecting module, wherein the projecting module is electrically coupled to the micro-processor. The first electronic device 110, the second electronic device 120, the third electronic device 130 and the fourth electronic device 140 are interlocked to engaged and electrically connected to the mini projector 100 for transmitting their digital data or video data to the mini projector 100. Moreover, first electronic device 110, the second electronic device 120, the third electronic device 130 and the fourth electronic device 140 may be electrically coupled to the mini projector 100 for facilitating digital data or video data transmitted from such electronic devices to the mini projector 100 to be projected via light exit port 101 of the mini projector 100.

For example, a command is issued from the electronic devices to the micro-processor of the mini projector 100. The video data output from the electronic devices or video output device is processed by the micro-processor and then the image picture of the video data is output to project by the projection module. Magnification of the image of projection may be adjusted based-on the actual applications or requirements. In other words, a command issued from the electronic devices may be utilized to directly or indirectly control the video picture of output.

Figure 2:
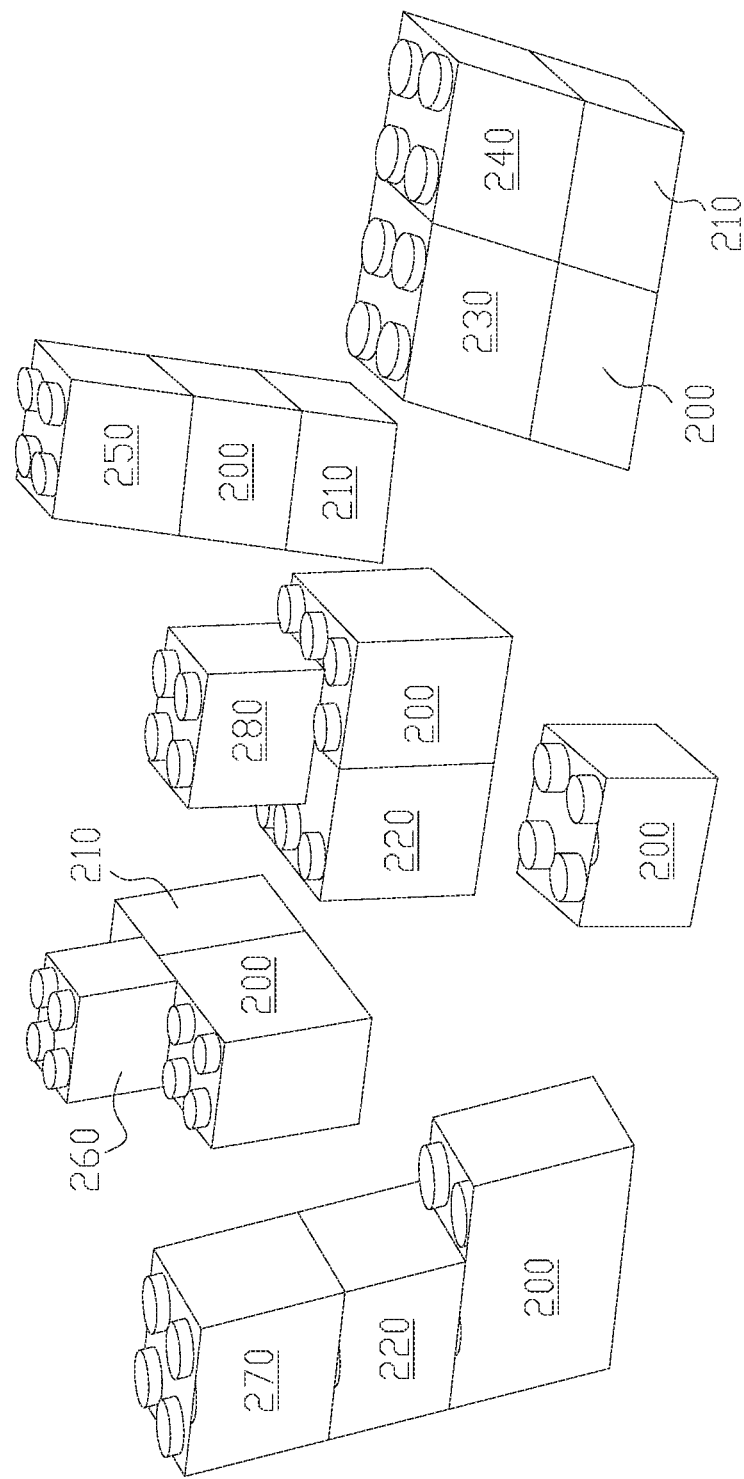
FIG. 2 illustrates a mini projecting system according to a second embodiment of the present invention.

FIG. 2 shows a projecting system with a mini projector combining with electronic devices according to another embodiment of the present invention. In this embodiment, the projecting system comprises a mini projector 200 with building brick structure for engaging to a corresponding building brick structure of electronic devices. For example, the mini projector 200 has a plurality of protrusion portions and concave portions. The mini projector 200 may be utilizing the building brick structure for vertically stacking or horizontally connecting to engage the corresponding building brick structure of electronic devices to constitute a projecting system. The building brick structure of the mini projector 200 and its coupling electronic devices may be disposed on upper side, lower side, left side, right side, front side or rear side, or at least one side of the six sides. In one embodiment, the mini projector 200 includes a wireless communication module for wirelessly communicating with other electronic devices. That is, the electronic device with wireless communication module can transmit video data to the mini projector 200, and the mini projector 200 is projecting the image of the received video data by wireless communication module of the mini projector 200.

In one embodiment, the projecting system includes a mini projector 200, a power supply or charging device (battery) 210, a Wintel Tablet Unit 230, and a stereo speaker 240. Right side building brick structure of the mini projector 200 is engaging to the charging device 210, and upper side building brick structure of the mini projector 100 is engaging to Wintel Tablet Unit 230. In this example, the lower side building brick structure of the stereo speaker 240 is interlocked to engaged and electrically connected to the upper side building brick structure of the charging device 210, and the left side building brick structure of the stereo speaker 240 is engaging to the right side building brick structure of Wintel Tablet Unit 230.

In another embodiment, the projecting system includes a mini projector 200, a power supply or charging device (battery) 210, and mini smart TV (Android Quad Core) 250. The mini projector 200 is configured between the charging device 210 and the mini smart TV 250. Upper side building brick structure of the mini projector 200 is engaging to the mini smart TV 250, and lower side building brick structure of the mini projector 200 is interlocked to engaged and electrically connected to the upper side building brick structure of the charging device 210.

In another embodiment, the projecting system includes a mini projector 200, a power supply or charging device (battery) 210, and mini smart TV (Android Quad Core) 250. The mini projector 200 is configured between the charging device 210 and the mini smart TV 250. Upper side building brick structure of the mini projector 200 is engaging to the mini smart TV 250, and lower side building brick structure of the mini projector 200 is interlocked to engaged and electrically connected to the upper side building brick structure of the charging device 210.

In one embodiment, the projecting system includes a mini projector 200, a mini camera 280 and Android unit module or device (such as Android Quad Core, Android Eight Core) 220. The mini projector 200 is configured on bottom of the projecting system. Left side building brick structure of the mini projector 200 is engaging to the Android unit module or device 220, and lower side building brick structure of the mini camera 280 is interlocked to engaged and electrically connected to the upper side building brick structure of the mini projector 200 and the Android unit module or device 220.

In yet another embodiment, the projecting system includes a mini projector 200, a wireless module (such as Bluetooth module) 260 and a charging device (battery) 210. The mini projector 200 is configured on bottom of the projecting system. Right side building brick structure of the mini projector 200 is engaging to the charging device (battery) 210, and lower side building brick structure of the wireless module 260 is interlocked to engaged and electrically connected to the upper side building brick structure of the mini projector 200 and the charging device (battery) 210.

In one embodiment, the projecting system includes a mini projector 200, Android unit module or device (such as Android Quad Core, Android Eight Core) 220, and a 4G LTE Unit (Long Term Evolution Unit) 270. The mini projector 200 is configured on bottom of the projecting system. Upper side building brick structure of the mini projector 200 is engaging to the Android unit module or device 220, and upper side building brick structure of the Android unit module or device 220 is interlocked to engaged and electrically connected to the lower side building brick structure of the 4G LTE Unit 270.

Size, configuration and orientation of the building brick structure of the above-mentioned electronic devices or modules may be adjusted based-on the practical requirements.

Configuration and engagement between the above-mentioned electronic devices or modules may be adjusted based-on the practical requirements.

Figure 3:
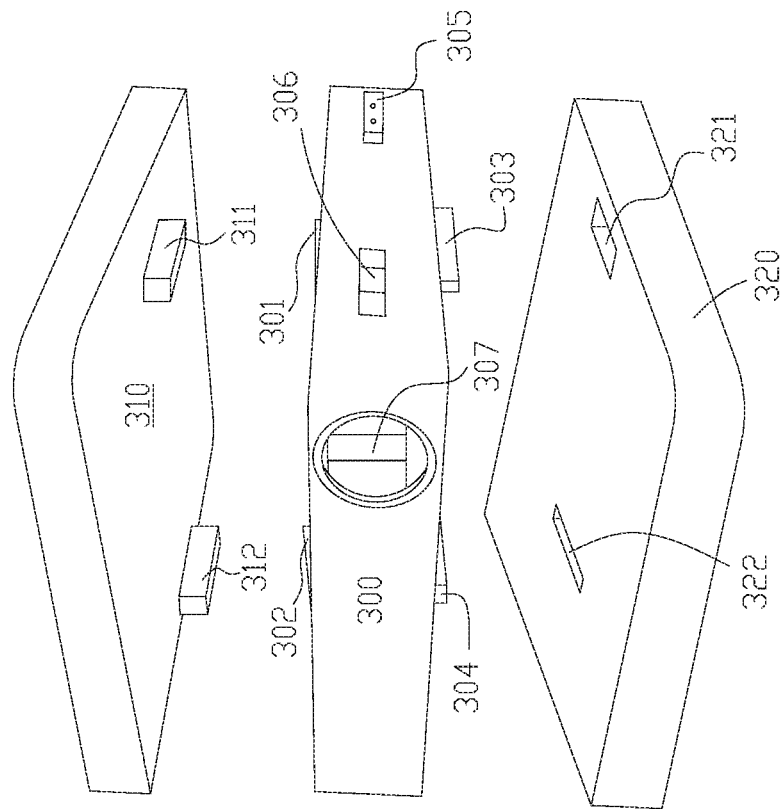
FIG. 3 illustrates a mini projecting system according to an embodiment of the present invention.

FIG. 3 shows a projecting system with a mini projector unit engaging with a charging unit and an application unit according to an embodiment of the present invention. In this embodiment, the projecting system comprises a mini projector unit 300, a charging unit (battery pack) 320, and an application unit (such as WiFi unit, Android unit, Wintel Tablet Unit) 310. For example, the mini projector unit 300 is configured on the middle of the projecting system. Upper side building brick structure 301, 302 of the mini projector unit 300 is used for engaging with the application unit 310, and lower side building brick structure 303, 304 of the mini projector unit 300 is used for engaging with the charging unit 320. In this example, building brick structure 321 of the charging unit 320 is used as an output port of a power supply, and building brick structure 322 of the charging unit 320 is used as a non-electrical engaging portion (opening, without electrical connection function). Building brick structure 303 of the mini projector unit 300 is used as an input port of a power supply, and building brick structure 304 of the mini projector unit 300 is used as a non-electrical engaging portion (protrusion, without electrical connection function). Besides, building brick structure 301 of the mini projector unit 300 is used as an output port of a power supply, and building brick structure 302 of the mini projector unit 300 is used as a signal input or output (I/O) port of the mini projector unit 300. Building brick structure 311 of the application unit 310 is used as an input port of a power supply, and building brick structure 312 of the application unit 310 is used as a signal input or output (I/O) port of the application unit 310.

It should be noted that configuration of the building brick structure mentioned above is used to illustrate the preferred embodiments of the invention rather than limiting the invention. Various modifications and similar arrangements of the building brick structure suitable for mechanically engaging and electrically coupling still included within the scope of the invention.

In one embodiment, transmission interface of the mini projector unit 300 may be selected from the group consisting of Video Graphics Array (VGA) interface, Digital Visual Interface (DVI), Universal Serial Bus (USB) interface, Digital Video Broadcasting (DVB) interface and High-Definition Multimedia Interface (HDMI). The mini projector unit 300 can use a suitable transmission interface based on user requirement for communicating with different protocol video signal, and thereby greatly increasing usability of the mini projector unit 300.

The mini projector unit 300 may be connected with the charging unit (battery pack) 320. In a preferred embodiment of the invention, the charging unit 320 is a rechargeable battery, which can be connected to a commercial power supply for charging the charging unit 320. Building brick structure of the charging unit 320 includes an engaging portion 322 and an electrical conductive portion 321, wherein the engaging portion 322 may be aligned to engage the engaging portion 304, and the electrical conductive portion 321 may be aligned to engage the engaging portion 303 for electrically communicating. When the charging unit 320 connects to the mini projector unit 300, the engaging portion 322 is engaged with the engaging portion 304, and the electrical conductive portion 321 is engaged with the engaging portion 303 for electrically communicating, and in order to facilitate energy transferring from the charging unit 320 to the mini projector unit 300 for operation of the mini projector unit 300.

The charging unit 320 may provide energy (power) to the mini projector unit 300 by the electrical conductive portion (I/O) 321 of the charging unit 320 coupling to the engaging portion (I/O) 303 of the mini projector unit 300. Therefore, the mini projector unit 300 may be operated during the charging unit 320 providing power to the mini projector unit 300. Besides, the mini projector unit 300 may provide energy (power) to the application unit 310 during the engaging portion (electrical I/O port) 301 of the mini projector unit 300 coupling to the engaging portion (electrical I/O port) 311 of the application unit 310. The engaging portion 311 of the application unit 310 may be used as input terminal of power supply. When the electrical I/O port 302 of the mini projector unit 300 is coupling to the electrical I/O port 312 of the application unit 310, data may be transmitting from the electrical I/O port 312 of the application unit 310 to the mini projector unit 300. The engaging portion 312 of the application unit 310 may be used as output terminal of data signal.

In one example, the mini projector unit 300 includes a switch 306 and another I/O port 305. The switch 306 is used for turning on and turning off the mini projector unit 310. I/O port 305 is for example a wired connection port or USB connection port.

Figure 4:
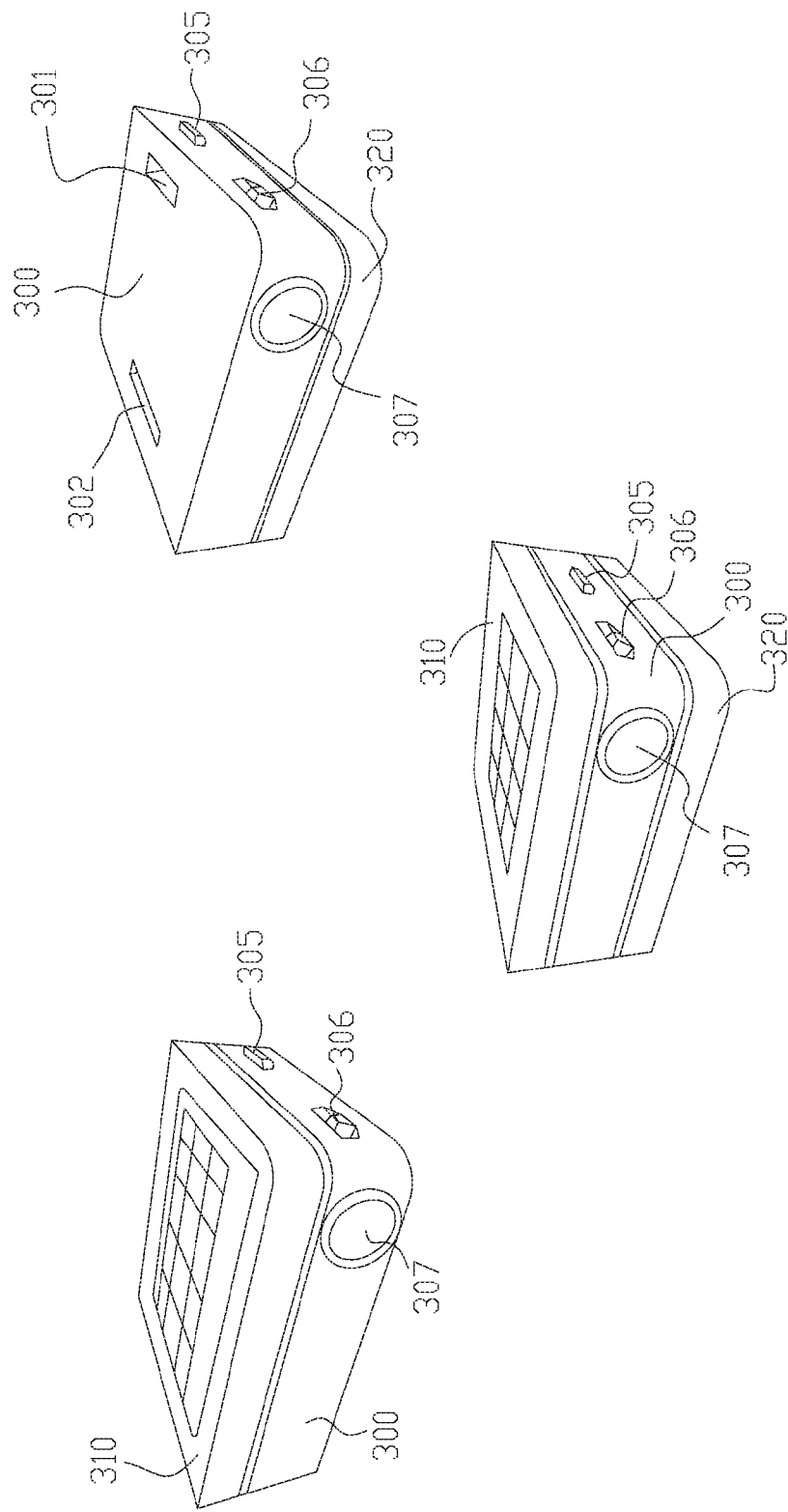
FIG. 4 illustrates a mini projecting system according to one embodiment of the present invention.

In some embodiment, the mini projector unit 300 may be combined with the charging unit 320 or the application unit 310. In another embodiment, the mini projector unit 300 may be combined with the charging unit 320 and the application unit 310, shown in FIG. 4. The application unit 310 is for example, WiFi Unit-Android Unit-Wintel Tablet Unit, which may provide some specified application software, programs. When the mini projector unit 300 is combined with the application unit 310, operational image of application software, programs of the application unit 310 may be projected via light exit port 307 of the mini projector unit 300 for image magnification. In one embodiment, the application unit 310 has a touch panel to be touched by user such that video software or program of application unit 310 can be operated and projected when connected to the mini projector unit 300.

In summary, the above-described embodiments of the present invention, concept of the building brick stacking (e.g., LEGO combination) is proposed, and the mini projector may be mechanically and electrically combined with the desired electronic devices or modules to form a mini projecting system. So, the identical mini projector can be connected with the desired electronic devices based on the requirements of consumers, and thereby greatly increasing the practical utility of mini projector. In addition, due to a combination or stacking of building bricks (blocks), input/output (I/O) port of each device unit can be removable or fixed to one side of the mini projector, so electronic devices or modules may be engaged with the mini projector without an extra cable or connector to connect, while taking into account the overall appearance and portability of the projecting system. Furthermore, since the mini projector can be optionally with a variety of devices or modules, so the appearance of mini projector can be designed to provide consumers with a variety of styles to choose. After that, you can combine the desired devices or modules to expand its capabilities of the projecting system.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A projecting system, comprising:
   a mini projector with at least one first building brick structure;
   a charging unit with at least one second building brick structure;
   wherein said at least one first building brick structure is structurally engaged and electrically coupled to said at least one second building brick structure; and
   at least one electronic device having at least one third building brick structure, wherein one of said third building brick structure of one of said at least one electronic device is structurally engaged and electrically coupled to one of said at least one first building brick structure.

2. The system of claim 1, wherein said at least one electronic device includes a mini smart TV.

3. The system of claim 1, wherein said at least one electronic device includes a speaker.

4. The system of claim 1, wherein said at least one electronic device includes a Tablet PC.

5. The system of claim 1, wherein said at least one electronic device includes a Tablet PC.

6. The system of claim 1, wherein said at least one electronic device includes a mini camera.

7. The system of claim 1, wherein said at least one electronic device includes a 4G LTE unit.

8. The system of claim 1, wherein said at least one electronic device includes an application unit.

9. The system of claim 1, wherein said at least one electronic device includes a wireless module.

\* \* \* \* \*